(12) United States Patent
Kornfield et al.

(10) Patent No.: US 7,179,509 B2
(45) Date of Patent: *Feb. 20, 2007

(54) POLYMERS FOR CONTROL OF ORIENTATION AND STABILITY OF LIQUID CRYSTALS

(75) Inventors: Julia A. Kornfield, Pasadena, CA (US); Michael D. Kempe, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/755,906

(22) Filed: Jan. 12, 2004

(65) Prior Publication Data
US 2004/0142117 A1 Jul. 22, 2004

Related U.S. Application Data

(63) Continuation of application No. 09/828,304, filed on Apr. 5, 2001, now Pat. No. 6,821,455.

(60) Provisional application No. 60/194,990, filed on Apr. 5, 2000.

(51) Int. Cl.
*C09K 19/38* (2006.01)
*C09K 19/52* (2006.01)
*G02F 1/1334* (2006.01)

(52) U.S. Cl. .................... 428/1.1; 428/1.3; 252/299.01; 349/86; 349/88; 349/183

(58) Field of Classification Search ................ 349/86, 349/88, 183; 252/299.01, 299.5; 428/1.1, 428/1.3
See application file for complete search history.

(56) References Cited

U.S. PATENT DOCUMENTS 5,321,533 A * 6/1994 Kumar ...................... 349/86
(Continued)

FOREIGN PATENT DOCUMENTS

EP 0 501 409 A2 * 2/1992
(Continued)

OTHER PUBLICATIONS

Dierking, Ingo; Polymer Network—Stabilized Liquid Crystals, vol. 12, No. 3, Feb. 3, 2000, pp. 167-181.
(Continued)

*Primary Examiner*—Shean C. Wu
(74) *Attorney, Agent, or Firm*—Christie, Parker & Hale, LLP.

(57) ABSTRACT

An electro-optically active polymer gel material comprising a high molecular weight alignment polymer adapted to be homogeneously dispersed throughout a liquid crystal to control the alignment of the liquid crystal molecules and/or confer mechanical stability is provided. The electro-optically active polymer gel comprises a homogenous gel in which the polymer strands of the gel are provided in low concentration and are well solvated by the small molecule liquid crystal without producing unacceptable slowing of its electrooptic response. During formation of the gel, a desired orientation is locked into the gel by physical or chemical cross-linking of the polymer chains. The electro-optically active polymer is then utilized to direct the orientation in the liquid crystal gel in the "field off" state of a liquid crystal display. The electro-optically active polymer also provides a memory of the mesostructural arrangement of the liquid crystal and acts to suppress the formation of large scale deviations, such as, for example, fan-type defects in a FLC when subjected to a mechanical shock. A method of making an electro-optically active polymer gel material and an electrooptic device utilizing the electro-optically active polymer gel of the present invention is also provided.

39 Claims, 12 Drawing Sheets

U.S. PATENT DOCUMENTS

| | | | |
|---|---|---|---|
| 5,321,534 A * | 6/1994 | Takatoh et al. | 349/92 |
| 5,540,858 A * | 7/1996 | Yoshinaga et al. | 252/299.01 |
| 5,812,227 A * | 9/1998 | Toshida et al. | 349/88 |
| 5,843,332 A * | 12/1998 | Takeuchi et al. | 252/299.01 |
| 6,128,056 A * | 10/2000 | Kubota et al. | 349/86 |
| 6,133,975 A * | 10/2000 | Li et al. | 349/134 |
| 6,157,425 A * | 12/2000 | Kuo et al. | 349/88 |
| 6,175,399 B1 | 1/2001 | Mitsui et al. | |
| 6,270,691 B2 * | 8/2001 | Park et al. | 252/299.01 |
| 6,452,650 B1 * | 9/2002 | Nakao et al. | 349/86 |
| 6,821,455 B2 | 11/2004 | Kornfield et al. | |
| 7,008,675 B2 * | 3/2006 | Kornfield et al. | 428/1.1 |

FOREIGN PATENT DOCUMENTS

| | | |
|---|---|---|
| EP | 0 501 409 B1 | 9/1992 |
| EP | 0 562 431 A1 | 9/1993 |
| EP | 0 703 287 B1 | 3/1996 |
| EP | 0 903 392 A1 | 3/1999 |
| JP | 2116824 | 5/1990 |
| WO | WO 94/23496 | 10/1994 |

OTHER PUBLICATIONS

Gautier, Pascal, et al.,; Infra-Red Study on the Evolution of the Polymerization of Mesogenic Diacrylates in a Low Molecular Mass Liquid Crystal Matrix, vol. 321, No. Part 2; Sep. 8, 1997; pp. 383-394.

Guymon, Allan C., et al.; Polymerization of polymer/ferroelectric liquid crystal composites formed with branched liquid crystalline bismethacrylates; vol. 24, No. 2; Feb. 1, 1998; pp. 263-270.

Kelly, S.M.; Anisotropic networks, elastomers and gels; vol. 24, No. 1, 1998, pp. 71-82.

International Search Report for Application No. PCT/US01/11303 which was filed on Apr. 5, 2001.

Patent Abstract of Japan, Publication No. 2116824, Published on May 2, 1990 in the Name of Dainnippon Ink & Chem KK dated Nov. 8, 2001.

* cited by examiner

POLYMERS FOR CONTROL OF ORIENTATION AND STABILITY OF LIQUID CRYSTALS

CROSS-REFERENCE TO RELATED APPLICATION(S)

This application is a continuation of U.S. application Ser. No. 09/828,304, which was filed on Apr. 5, 2001, now U.S. Pat. No. 6,821,455 which itself claims priority on Provisional U.S. Application No. 60/194,990, filed Apr. 5, 2000, the disclosures of which are incorporated by reference.

STATEMENT REGARDING FEDERALLY SPONSORED RESEARCH OR DEVELOPMENT

The U.S. Government has certain rights in this invention pursuant to grant No. F49620-97-1-0014, awarded by the Air Force Office of Strategic Research, Liquid Crystals M.U.R.I.

FIELD OF THE INVENTION

This invention relates generally to alignment materials for use in liquid-crystal electrooptic devices. More specifically, this invention relates to polymeric alignment materials that reduce or eliminate the need for separate polymeric alignment layers and provide improved mechanical stabilization to liquid crystals.

BACKGROUND OF THE INVENTION

Liquid crystal electrooptic devices such as flat panel displays rely on active alignment, or control, of the orientation of the liquid crystal molecules when no field is applied. A parameter of a liquid crystal structure, such as director orientation or smectic layer structure, may be said to be actively aligned if alignment layers induce a preferred configuration on the parameter and if when the preferred configuration is perturbed, the alignment layers exert a restoring force or torque.

There are a number of different conventional methods for controlling the orientation of the liquid crystals in the absence of a field. For example, in a twisted nematic display, the liquid crystal orientation is anchored at the surfaces on each side of the device and aligned parallel to the surfaces using rubbed polymer layers where the rubbing directions are mutually orthogonal to produce a twisted liquid crystal configuration. There are a number of difficulties associated with this approach, mainly associated with the rubbing procedure that is needed to induce the orientation in the alignment layers.

More problematic are smectic liquid crystal displays, such as, for example, ferroelectric liquid crystals (FLCs), used for bi-stable displays or newer analog "thresholdless FLC" devices. For FLC display panels and other smectic LCDs, the structure of the smectic layers as well as the orientation of the director is an important parameter. For existing smectic LCDs, the smectic layers of the FLC must be aligned in a "bookshelf arrangement," and this orientation of the FLC is produced using polymer alignment layers with special thermal histories.

In addition to the same problems caused by rubbing that occur in nematic displays, a major deficiency in this means of controlling the oriented state is that they are very susceptible to mechanical disruption, and alignment generally does not recover after having been perturbed by mechanical stress. However, for LCDs containing the more ordered smectic liquid crystal materials, the smectic layer structure is only passively aligned by cooling through the nematic to smectic phase transition, i.e., there is no uniquely specified periodicity in the interaction between the alignment layer and adjacent liquid crystal molecules defining the alignment which the smectic layers should adopt. Thus, if this alignment is disturbed in the smectic phase, there is no force acting to restore the original alignment. Accordingly, a small mechanical shock can disrupt the orientation state, causing orientational defects to form, which cannot be removed by any existing technology. So while smectic LCDs and, in particular, ferroelectric LCDs are strong contenders for use in high definition television (HDTV) displays, memory displays, and computer work stations, their poor resistance to mechanical shock currently limits commercial FLC devices to small sizes, typically less than a few centimeters on a side. There are known ways of reducing this problem, such as, for example, through the use of damped mountings and adhesive spacer techniques for fabrication of FLC panels. However, these techniques are not effective against all possible types of mechanical damage, such as a sudden impact or continuous pressure.

Several patents attempt to address the problems associated with the stability of conventional liquid crystal displays via various conventional mechanical alignment layer means. For example, JP 52 411 discloses an arrangement in which dichromatic molecules are bonded to an alignment layer. Liquid crystal molecules then align on the layer of dichromatic molecules. However, this method still has the problem of a weak alignment layer-liquid crystal layer interface. Meanwhile, EP 307 959, EP 604 921 and EP 451 820 all disclose various techniques for obtaining particular structures within ferroelectric liquid crystal layers which are intended to provide improved mechanical stability. However, the structures disclosed in the specifications are incompatible with high speed, high contrast addressing schemes and are therefore of very limited application. EP 635 749 discloses an adhesive spacer technique for the fabrication of FLC display panels so as to provide more resistance to mechanical damage. However, as described hereinbefore, techniques of this type are not effective against all possible types of mechanical damage. Also, EP 467 456 discloses the use of a liquid crystal gel layer as an alignment layer. However, this type of alignment layer is used merely to control the pre-tilt angle of the liquid crystal material in the cell and does not improve the mechanical stability.

A second method for aligning liquid crystals uses a phase-separated polymer to control alignment and provide mechanical stability, rather than an alignment layer. There are two general techniques, polymer-dispersed liquid crystals and polymer-stabilized liquid crystals. These systems function similar to alignment layers, in that the interactions between the liquid crystal molecules and the polymer occur only at the interface between the solid polymer and the liquid crystal. Typically, the polymer is synthesized in situ by photochemistry or thermally triggered crosslinking of monomer (or macromer) dissolved into the liquid crystal. As the molecular weight of the polymer grows, the system phase-separates into polymer rich, solid and liquid crystal rich, nematic or smectic phases. The nature of the liquid crystal orientation at the resulting liquid crystal polymer interfaces is typically controlled by the structure of the polymer or surface-active agents that are incorporated in the system. In some cases, the orientation direction is influenced using an applied electric or magnetic field during polymerization so that the resulting polymer provides a lasting memory of the orientation state. In this technique the alignment polymer is made anisotropic by applying a flow or an electric field, then after the desired orientation of the solvated monomer or prepolymer is generated, the polymer is transformed so that it provides a lasting memory of the orientation state, e.g., by photochemically or thermally-triggered cross-linking. These techniques do improve the mechanical stability of the liquid crystals.

For example, GB 2 274 652 discloses an arrangement in which a conventional low molar mass ferroelectric liquid crystal mixture is doped with a polymeric additive. However, while this arrangement is intended to improve mechanical stability, of ferroelectric liquid crystals it results in reduced switching speed for the electrooptic device.

Similarly, EP 586 014 discloses arrangements of a polymer network created by photoinitiated polymerization of an aligned liquid crystal containing monomer. However, while this arrangement does improve mechanical stability, it results in reduced switching speed for the electrooptic device.

Finally, S. H. Jin et al, "Alignment of Ferroelectric Liquid-crystal Molecules by Liquid-Crystalline Polymer," SID 95 Digest, (1995) 536–539 discloses the use of a main chain thermotropic liquid crystal polymer as an alignment layer for an FLC cell. However, the liquid crystal alignment is obtained by conventional mechanical rubbing of this layer, the liquid crystal polymer being in its glassy phase at room temperature.

Accordingly, a need exists for an improved material for use in aligning liquid crystal electrooptic devices which reduces or eliminates the need for a separate alignment layer and which provides greater mechanical stabilization to a wide range of fast switching liquid crystal displays.

SUMMARY OF THE INVENTION

The present invention is directed to an electro-optically active polymer gel material comprising an alignment polymer adapted to be homogeneously dispersed throughout a liquid crystal to control the alignment of the liquid crystal molecules and confer mechanical stability. This invention utilizes a homogenous gel in which the polymer strands of the gel are provided in low concentration such that they are at least substantially solvated by the small molecule liquid crystal. A desired orientation is then locked into the gel by physical or chemical cross-linking of the polymer chains. The orientation of the polymers is then utilized to direct the orientation field in the liquid crystal in the "field off" state of a liquid crystal display. In this invention the strands of the polymer also provide a memory of the mesostructural arrangement of the liquid crystal and act to suppress the formation of large scale deviations, such as, for example, fan-type defects in an FLC when subjected to a mechanical shock.

In one embodiment, the invention is directed to an electro-optically active, homogeneously dispersed polymer gel layer of liquid crystalline material comprising a permanently oriented anisotropic polymerized material containing molecules of at least one sparsely cross-linked homogeneously dispersed polymer at least partially solvated by molecules of at least one liquid crystalline material or mesogen, wherein the polymer is provided in low enough concentrations such that the switching response of the liquid crystal polymer gel is acceptably fast for electrooptic operations. In one particular embodiment the polymer is adapted to mechanically stabilize the gel. Any suitable polymer and liquid crystal mixture can be utilized such that the polymer is at least partially solvated by the liquid crystal molecules, such as, for example, a side-chain or main-chain polymer block or telechelic polymer having a liquid crystal mesogen. Any suitable method of forming the electro-optically active polymer gel may be utilized, such as, for example, by self-assembly of a main-chain or side-chain block copolymer, by photopolymerization of a soluble macromer, or by a mixture of the two.

Although any suitably dilute concentration of polymer may be utilized such that the switching speed of the liquid crystal is not significantly reduced (for example, where the switching time more than doubles over the switching time of the pure liquid crystal molecules) and such that the polymer molecules are capable of sparsely cross-linking to form the polymer network, in one preferred embodiment the electro-optically active gel comprises less than 5% of the gel layer by mass and more preferably equal to or less than 2% of the gel layer by mass.

Likewise, although any high molecular weight polymer may be utilized such that the polymer is capable of sparsely cross-linking even at dilute concentrations, in a preferred embodiment the polymer has a molecular weight of at least 100,000 g/mol, more preferably at least 500,000 g/mol, and even more preferably at least 1 million g/mol.

In another embodiment, the homogeneously dispersed polymer component of the electro-optically active polymer gel is selected such that the polymer molecules dictate the alignment of the liquid crystal molecules in the absence of an electric field. In this embodiment any alignment geometry suitable for the desired liquid crystal material or electrooptic device may be induced in the gel, such as, for example, uniaxial, twisted, supertwisted, tilted, or bookshelf.

In yet another embodiment, the liquid crystal molecules are selected from the group of fluorinated or cyanobiphenyl (CB) based liquid crystal molecules.

In still another embodiment, the network of liquid crystal molecules comprises a plurality of self-assembly block copolymers each comprising at least one endblock and at least one midblock, wherein the endblock either physically or chemically cross-links with at least one other endblock and wherein the midblock is soluble in the liquid crystal molecules. In such an embodiment the endblock may be insoluble in the liquid crystal molecules thereby physically aggregating with other polymers. In such an embodiment the midblock may further comprise a plurality of liquid crystal side-chains, wherein the liquid crystal side-chains confer solubility to the block copolymer in the liquid crystal molecules, or alternatively the midblock may be a main-chain polymer comprising a plurality of liquid crystal mesogens, and wherein the main-chain confers solubility to the block copolymer in the liquid crystal molecules, or in yet another alternative the midblock may comprise a mixed side-chain/main-chain polymer, where at least one of the main-chain or the side-chain confers solubility to the block copolymer in the liquid crystal molecules.

In such an embodiment the cross-linking may occur at any point on the polymer chain. For example, the polymer molecules may be cross-linked only at the ends or the midblock may further comprise at least one linking block, wherein the linking block is either physically or chemically cross-links with either the linking block or endblock of another polymer.

In still yet another such embodiment the endblock may be made crosslinkable with other endblocks by application of either a photo or thermal initiating energy. In such an embodiment the photo initiating energy may be any suitable energy, such as, for example, UV-light, X-ray, gamma-ray, and radiation with high-energy electrons or ions.

In still yet another embodiment, the electro-optically active gel comprises a plurality of self-assembled telechelic polymers each comprising at least one crosslinking functional group, where the crosslinking functional group either physically or chemically cross-links with at least one other crosslinking functional group and wherein the telechelic polymer is soluble in the liquid crystal molecules. In such an embodiment, the crosslinking functional group may be insoluble in the liquid crystal molecules. Also in such an embodiment the telechelic polymer may further comprise a plurality of liquid crystal side-chains, where the liquid crystal side-chains confer solubility to the telechelic polymer in the liquid crystal molecules, or alternatively the telechelic polymer may be a main-chain polymer comprising a plurality of liquid crystal mesogens, where the main-chain confers solubility to the telechelic polymer in the liquid crystal molecules, or again alternatively the telechelic polymer may comprise a mixed side-chain/main-chain polymer, where at least one of the main-chain or the side-chain confers solubility to the telechelic polymer in the liquid crystal molecules.

In such an embodiment the telechelic polymer may be cross-linked by any suitable means. For example, the telechelic polymer may further comprise at least two crosslinking groups at either end of the telechelic polymer.

In an alternative embodiment the crosslinking group is made crosslinkable with other crosslinking groups by application of either a photo or thermal initiating energy. In such an embodiment the photo initiating energy may be selected from any suitable source, such as, for example, UV-light, X-ray, gamma-ray, and radiation with high-energy electrons or ions.

In still yet another alternative embodiment, the liquid crystal molecules are aligned according to a geometry selected from the group consisting of: uniaxial, twisted, supertwisted, tilted, chevron and bookshelf.

In still another embodiment, the invention is directed to an electrooptic device incorporating the electro-optically active gel layer of the invention. Any suitable electrooptic device may be utilized, such as, for example, a liquid crystal display device or an electroluminescent lamp.

In still yet another embodiment, the invention is directed to a method for constructing an electrooptic device utilizing the electro-optically active gel layer of the invention. The method comprising homogeneously dispersing a small quantity of the high molecular weight polymer described above into a quantity of liquid crystal molecules, orienting the liquid crystal molecules and polymers and sparsely crosslinking the polymers to form a gel adapted to mechanically stabilize the liquid crystal molecules. In such a method the gel may also be adapted to dictate the alignment of the liquid crystal molecules.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

The present invention is directed to an electro-optically active liquid crystal gel comprising a low concentration sparsely cross-linked homogeneously dispersed liquid crystal soluble polymer and a mixture of liquid crystal molecules.

Figure 1A:
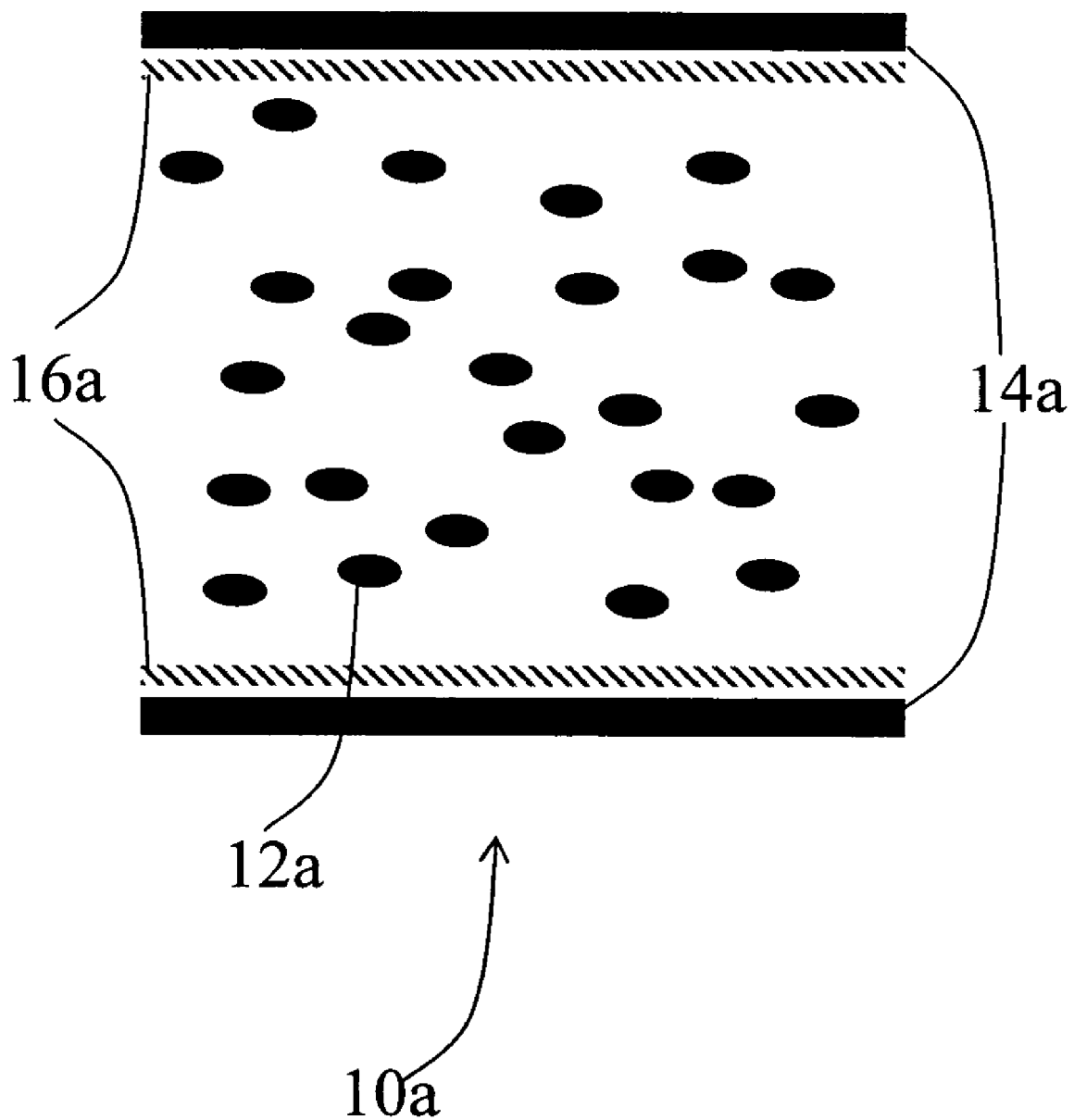
FIG. 1a is a schematic view of a system for aligning liquid crystal molecules according to the prior art.
Figure 1B:
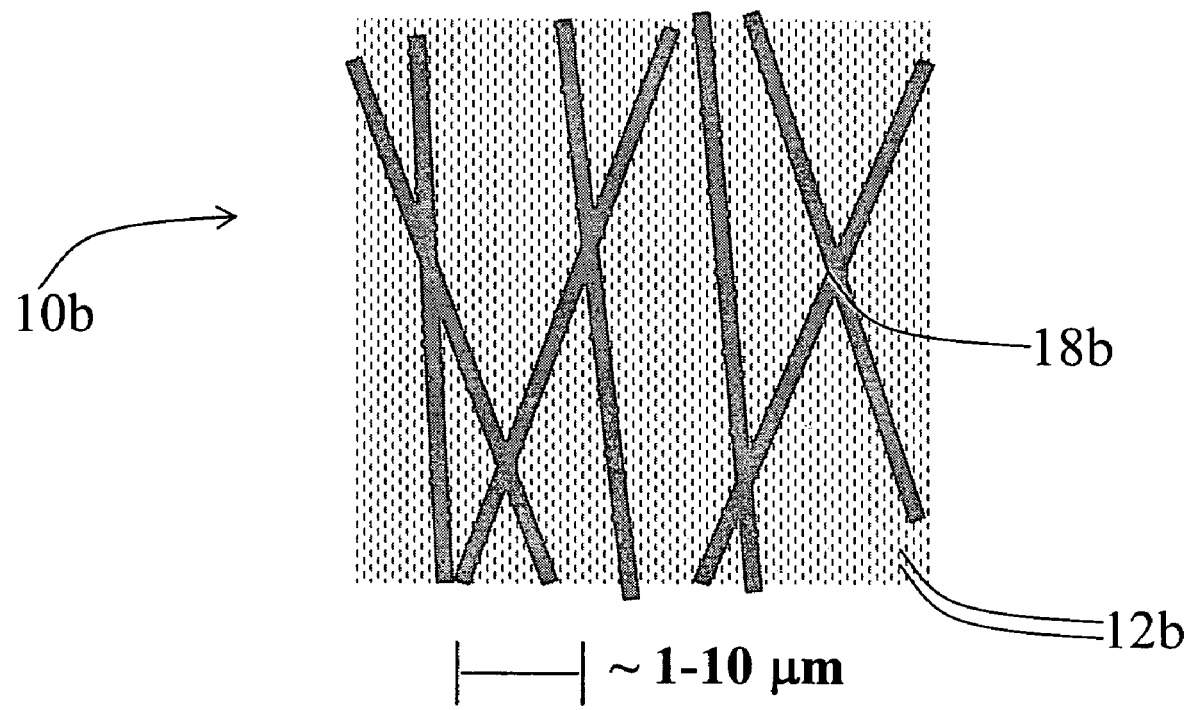
FIG. 1b is a schematic view of a system for aligning liquid crystal molecules according to the prior art.
Figure 1C:
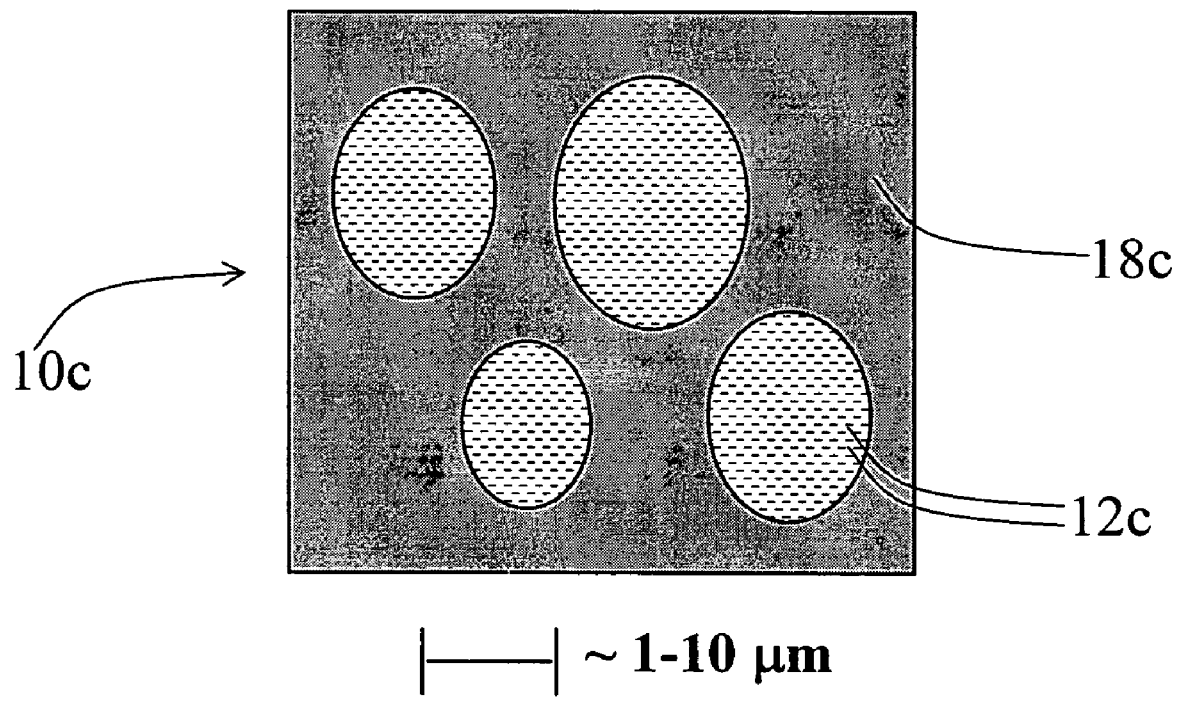
FIG. 1c is a schematic view of a system for aligning liquid crystal molecules according to the prior art.

As discussed above, there are a number of different methods for controlling the orientation of the liquid crystals. FIGS. 1a to 1c schematically show the conventional methods for inducing alignment control in liquid crystal electrooptical devices. FIG. 1a shows the conventional rubbed polymer method of orienting both nematic and ferroelectric display devices 10a. In this method, the liquid crystal molecules 12a are disposed between surfaces 14a on each side of the device 10a and aligned parallel to the surfaces 14a using rubbed polymer layers or alignment layers 16a. There are a number of difficulties associated with this approach, mainly associated with the rubbing procedure that is needed to induce the orientation in the alignment layers 16a. In addition, mechanical stress can cause disruption of the liquid crystal structure and in some displays, such as, for example, ferroelectric display's alignment does not always recover after having been perturbed by mechanical stress.

A second general method for aligning liquid crystals 12b is shown in FIGS. 1b and 1c and uses a phase-separated polymer network 18b to control alignment and provide mechanical stability, rather than a separate mechanical alignment layer. There are two general techniques, polymer-stabilized liquid crystals, shown in FIG. 1b, and polymer-dispersed liquid crystals, shown in FIG. 1c. Similar to the use of alignment layers, the interactions between the liquid crystal molecules 12a and the polymer 18 occur only at the interface between the polymer 16a and the liquid crystal molecules 12a. In polymer-stabilized liquid crystals, the polymer molecules 18b are typically made anisotropic by polymerizing e.g., by photochemically or thermally-triggered polymerization of monomer, or crosslinking of oligomers or thermally triggered physical association, under the influence of either an alignment layer or an electric field, so that it provides a lasting memory of the orientation state. Although these techniques do improve the mechanical stability of the liquid crystals, polymer-dispersed liquid crystals can sometimes require high applied switching voltages and display devices made using both of these techniques tend to be hazy.

Figure 1D:
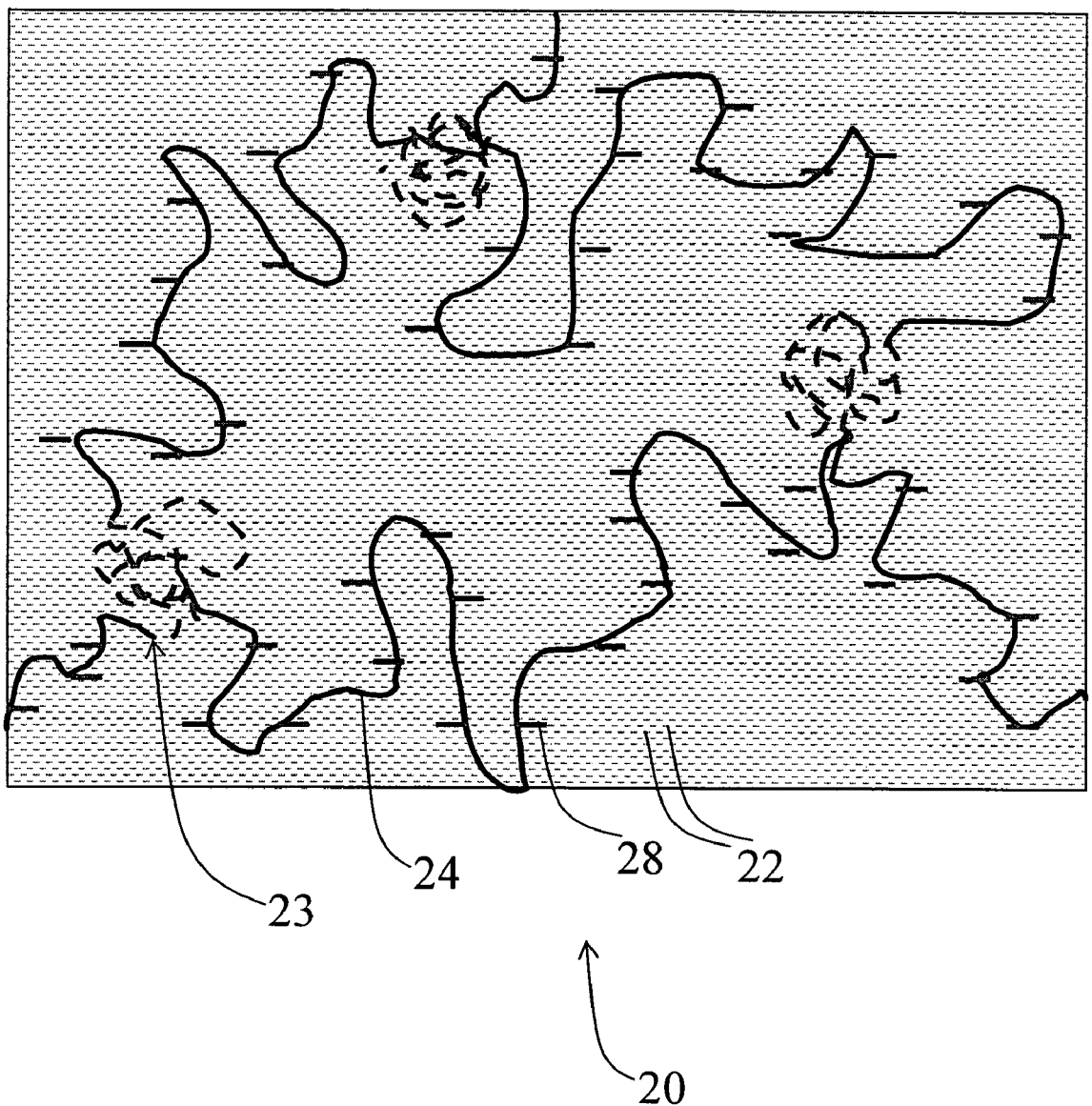
FIG. 1d is a schematic view of a system for aligning liquid crystal molecules according to the present invention.

The electro-optically active gel layer 20 in accordance with the present invention is shown in FIG. 1d. The electro-optically active gel layer 20 comprises a dilute solution of an anisotropic network 23 of polymer 24 homogeneously dispersed within a solvent comprising a homogeneous or heterogeneous mixture of small liquid crystal molecules 22. The anisotropic network 23 of cross-linkable polymer 24 itself comprises a cross-linkable backbone 26 and a plurality of liquid crystal mesogens 28 attached thereto. The anisotropic network of polymer 24 is characterized in that an orientation can be induced into the polymer 24 via an external orienting influence and then frozen into an anisotropic network 23 of polymer molecules 24 via a physical or chemical cross-linking reaction between the individual polymers 24. The unbound ferroelectric or nematic liquid crystal molecules 22 of the electro-optically active material 20 in solution with the polymer 24 are then subject to interactions with the oriented anisotropic network 23 of polymer 24 such that the orientation of the liquid crystal molecules 22 is dictated by the orientation of the anisotropic network of polymer 24.

Although the interconnected polymer is discussed in terms of a "network" it should be understood that the polymer and liquid crystal makes a homogeneous gel material and that the network is not an insoluble matrix of material surrounded by liquid crystal as is found in many conventional systems. In the current invention the polymer is homogeneously dispersed and at least partially solvated by the liquid crystal.

Any homogenous or heterogenous mixture of liquid crystal molecules 22 can be utilized as a solvent such that the electro-optically active layer 20 is in a gel state and exhibits nematic, chiral nematic, ferroelectric, antiferroelectric or electroclinic properties and such that during operation the liquid crystal molecules 22 exhibit a suitable electro-optically active phase under conventional operating conditions for an electrooptic device, such as, for example, a nematic, chiral nematic, smectic C chiral smectic C or smectic A phase at temperatures in the range from about −10° to 60° C. Because a variety of different electrooptic devices are contemplated, any suitable liquid crystal molecules or mixtures can be used, such as, for example, nematic cyanobiphenyl (CB) based liquid crystals or eutectic mixtures thereof, or ferroelectric phenylbenzoate (PB) based liquid crystals, Zli 3654 (Merck) or eutectic mixtures thereof or various fluorinated liquid crystals or eutectic liquid crystal mixtures. In another embodiment, liquid crystal molecules 22 having dichroic properties are utilized such that a polarizer is not required in any electrooptical device utilizing the electro-optically active material 20 of the invention.

The polymer 24 is chosen such that it is at least partially soluble in the liquid crystal molecules 22 solvent and can be sparsely cross-linked even under dilute conditions to form an oriented anisotropic three-dimensional polymer network 23 which is a liquid crystal gel electro-optically active material 20 and which is homogeneously dispersed in a solubilized by the liquid crystal 22. Although any suitably dilute concentration of polymer 24 may be utilized such that the switching speed of the liquid crystal is not significantly reduced (for example, where the switching time more than doubles over the switching time of the pure liquid crystal molecules 22) and such that the polymer molecules 24 are capable of sparsely cross-linking to form the polymer network, in one preferred embodiment the electro-optically active layer comprises less than 5% of the gel layer by mass and more preferably equal to or less than 2% of the gel layer by mass.

In light of the functional requirements, high molecular weight polymer molecules 24, such as, for example, polymers with a molecular weight of at least 100,000 g/mol, more preferably at least 500,000 g/mol, and even more preferably polymers with a molecular weight of at least 1 million g/mol, having side-unit or main-chain liquid crystal groups or mesogens 28 with an affinity for the liquid crystal molecules 22 of the electro-optically active material 20 and having only a few insoluble and/or cross-linking blocks or functional groups 30 are chosen. Within the structural features listed above, however, any polymer 24 that can coordinate or bond with the chosen liquid crystal and which provides sufficient field-off anisotropy and/or suitable structural stability can be utilized in the current invention, such as, for example, block or telechelic polymers. Furthermore, the polymer 24 can be made using any suitable technique, such as, for example, radical, anionic, or polymer analogous, in which the polymer backbone 26 is first made, then a mesogen 28 added, and then the polymers are cross-linked via a cross-linkable end portion 30. The liquid crystal mesogen 28 can be linked to the polymer via any suitable means, such as, for example, by incorporation of the mesogen 28 into the main-chain of the polymer or attachment of the mesogen 28 as a side-unit, with or without a spacer 31. Likewise, although only end cross-linking or insoluble groups 30 are shown, it should be understood that such groups 30 may be positioned at any point along the chain of the polymer 24.

Figure 2A:
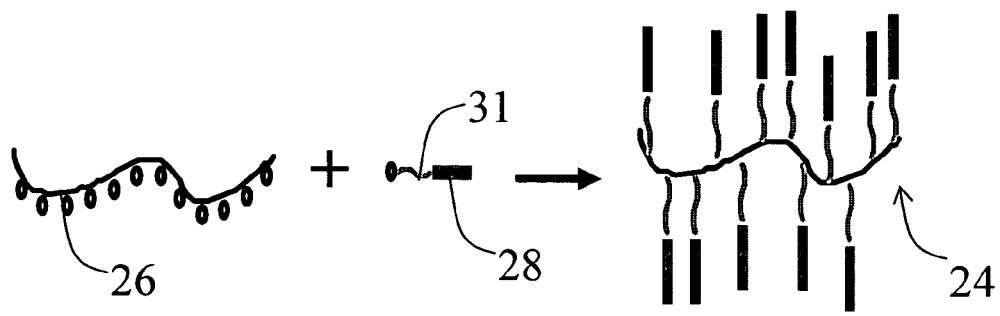
FIG. 2a is a schematic view of a polymer liquid crystal alignment system according to the present invention.
Figure 2B:
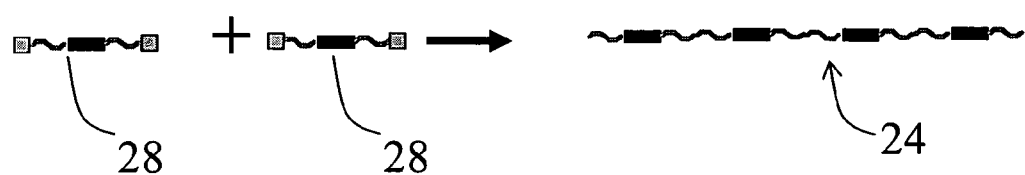
FIG. 2b is a schematic view of a polymer liquid crystal alignment system according to the present invention.
Figure 2C:
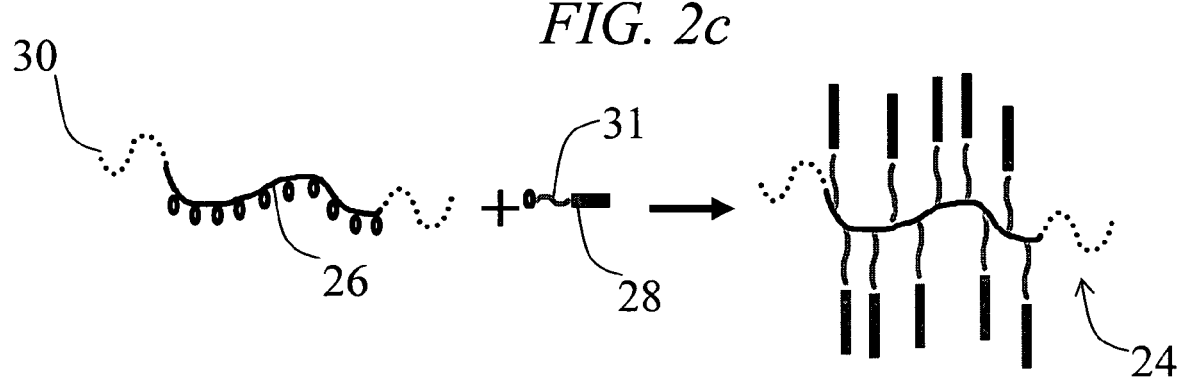
FIG. 2c is a schematic view of a polymer liquid crystal alignment system according to the present invention.

FIGS. 2a to 2c schematically depict three possible polymers 24 according to the present invention. FIG. 2a depicts the reaction between a polymer backbone 26 and a liquid crystal mesogen 28 in which the liquid crystal 28 is attached as a side-unit to the backbone 26 to form a side-chain polymer 24 according to the present invention. FIG. 2b shows the reaction between a plurality of liquid crystal mesogens 28 in to form a main-chain polymer 24 according to the present invention. Finally, FIG. 2c depicts the formation of a block or telechelic polymer having end-units 30 attached to either end of the backbone 26 to provide a cross-linking function to the polymer 24 according to the present invention.

Although the embodiments of the polymer 24 shown in FIGS. 2a to 2c all depict either main-chain or side-chain block polymers, it should be understood that any polymer 24 with the suitable alignment, structural and solubility characteristics could be utilized in the electro-optically active gel layer 20 according to the present invention. In addition, any suitable method of cross-linking the individual polymer molecules 24 to form the polymer network 23 of the electro-optically active material 20 can be utilized. For example, in the embodiment of the invention shown in FIG. 2c, the anisotropic network 23 is created by self-assembly of a block copolymer 24 comprising end blocks 30 that are insoluble in the liquid crystal molecules 22 such that they aggregate to form the physical cross-links and midblocks or backbones 26 that are soluble in the liquid crystal molecules 22. In another embodiment, the polymer network 23 of the current invention is formed by photo or thermally polymerizing the end blocks 30 of a prepolymer or macromer 24 that is soluble in the desired liquid crystal molecules 22. Any suitable photo or thermal polymerizable end block 30 may be used, such as, for example, acrylates, methacrylates, epoxy compounds and/or thiolene systems. In the case of photo-polymerization, an additional photo-initiator may be required, such as, for example, Igacure 651 (Merck). Any suitable radiation may be used to trigger the photo-polymerization, such as, for example, UV-light, X-rays, gamma-rays or radiation with high-energy particles such as electrons and ions In either such embodiment the solubility of the midblock or backbone 26 of the polymer 24 is conferred either by soluble units within the main-chain (as shown schematically in FIG. 2b), by side-groups selected to confer solubility (as shown in FIG. 2a), or by a mixture of the two techniques. Any suitable solubilizing units or mesogens 28 can be utilized, such as, for example, any homogenous or heterogenous mixture of liquid crystal molecules exhibiting nematic, ferroelectric, antiferroelectric or electroclinic properties and such that the mesogens 28 have an affinity for the liquid crystal molecules 22 of the electro-optically active material 20. Such mesogens 28 may exhibit any suitable electrooptically active phase, such as, for example, a nematic, chiral nematic, chiral smectic C, smectic C or smectic A phase. Because a variety of different electrooptic devices are contemplated, any suitable liquid crystal molecules or mixtures can be used, such as, for example, nematic cyanobiphenyl (CB) based liquid crystals or eutectic mixtures thereof, or ferroelectric phenylbenzoate (PB) based liquid crystals, Zli 3654 (Merck) or eutectic mixtures thereof, or of various fluorinated liquid crystals or eutectic mixtures thereof. In another embodiment, mesogens 28 having dichroic properties are utilized such that a polarizer is not required in any electrooptical device utilizing the electro-optically active material 20 of the invention.

Orientation can be induced in the liquid crystal molecules 22 by any suitable technique. For example, uniaxial, twisted, supertwisted, tilted, chevron and bookshelf orientations of the liquid crystal molecules 22 can be induced in the electro-optically active material 20 of the current invention by varying the orientation directions of orientation layers and the thickness of the cell holding the electro-optically active material 20 as shown in FIG. 1a and then fixing the orientation by cross-linking the polymers 24 of the electro-optically active material 20 to form an oriented polymer network 23 as described above. Although orientation layers do provide one method of providing an initial orientation to the electro-optically active material 20 of the current invention, it should be understood that orientation layers are not needed to maintain orientation of the liquid crystal molecules 22, as in many conventional electro-optically active materials, since such orientation is provided by the polymer network 23 itself. In one embodiment, then, a desired orientation is first provided by an external field or flow, such as, for example, an electrical or magnetic field, or an oscillatory or unidirectional shear induced flow, or an extensional stress and then the induced orientation is fixed via cross-linking of the polymer molecules 24 and formation of the anisotropic polymer network 23.

Figure 3:
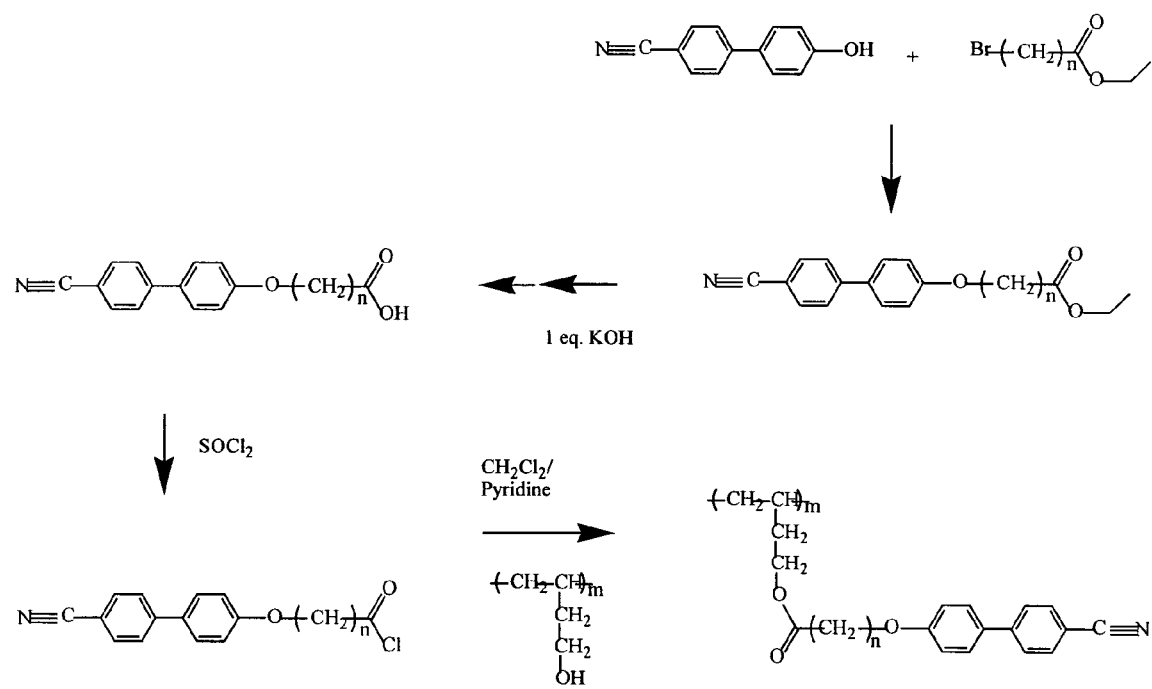
FIG. 3 is a synthesis pathway of an embodiment of the polymer according to the present invention.
Figure 4:
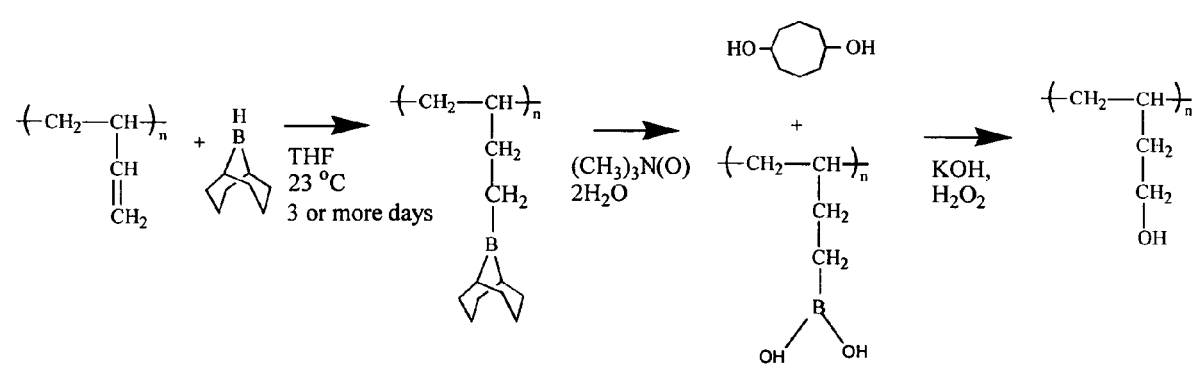
FIG. 4 is a synthesis pathway of an embodiment of the polymer according to the present invention.
Figure 5:
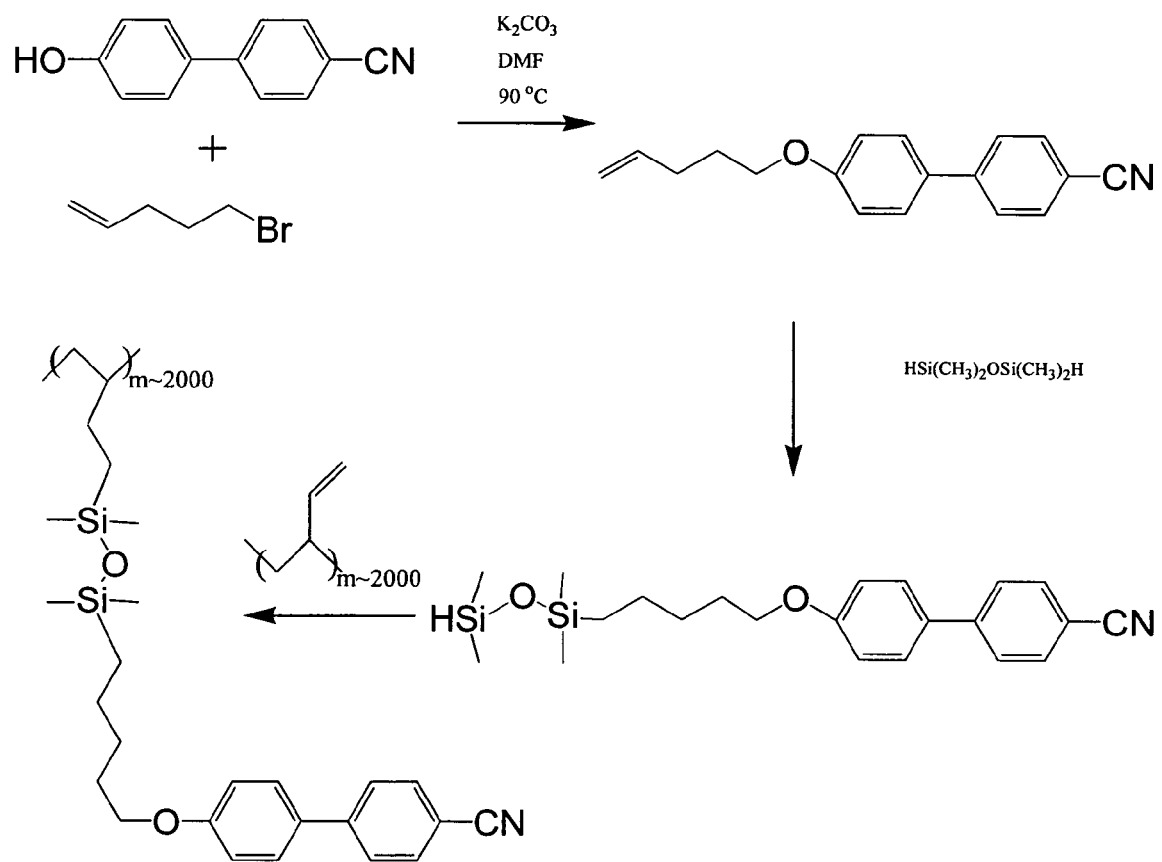
FIG. 5 is a synthesis pathway of an embodiment of the polymer according to the present invention.

The invention is also directed to a method of forming the electro-optically active liquid crystal gel according to the invention. Accordingly, in one exemplary embodiment, an electro-optically active material 20 of the current invention was formed utilizing a polymer analogous approach. The electro-optically active gel solution 20 was formed by mixing cyanobiphenyl liquid crystal molecules 22, with a cyanobiphenyl polymer 24 synthesized according to the reaction scheme in FIG. 3. The cyanobiphenyl or CB based liquid crystal molecules 22 can be synthesized according to conventional techniques or alternatively purchased either as a purified substance, such as, for example CB5 or CE50 (Merck) or as a mixture of liquid crystal molecules, such as, for example E7 or E44 (Merck). In this mixture the backbone 26 of he polymer 234 is a 1,2-polybutadiene polymer $24m$ synthesized according to the reaction scheme in FIG. 4. Alternatively, the polymer may be synthesized according to the reaction scheme shown in FIG. 5. To encourage cross-linking of the polymer molecules, conventional end blocks or end functional groups 30 are added to the mixture. These groups may provide either physical or chemical cross-linking under a variety of conditions. To prevent aggregation, or cross-linking before an orientation has been induced in the gel, the mixture is brought to a high temperature at which aggregation does not occur. Although this temperature may vary according to the cross-linking group utilized, typically a temperature of about 80° C. ensures that the polymer molecules can still flow. At this temperature the mixture is usually in the nematic phase, and can be oriented under the influence of a conventional alignment layer, an external electric field, or a shear strain. Under said conditions an anisotropic orientation of the electro-optically active material 20 is obtained. Subsequently, the polymer 24 is made to cross-link or aggregate to form an anisotropic network and an electro-optically active layer either by simply cooling the temperature of the mixture to a point at which self-assembly of the cross-linkable units 30 aggregate or cross-link, typically about 30° C., or via photo or thermal initiate cross-linking. Although the above method utilizes a polymer analogous approach to synthesize the polymer 24 according to the invention, it should be understood that any suitable method may be used, such as, for example, by radical or anion techniques. Likewise, although a block copolymer is described any suitable polymer may be synthesized, such as, for example a telechelic polymer.

Figure 6:
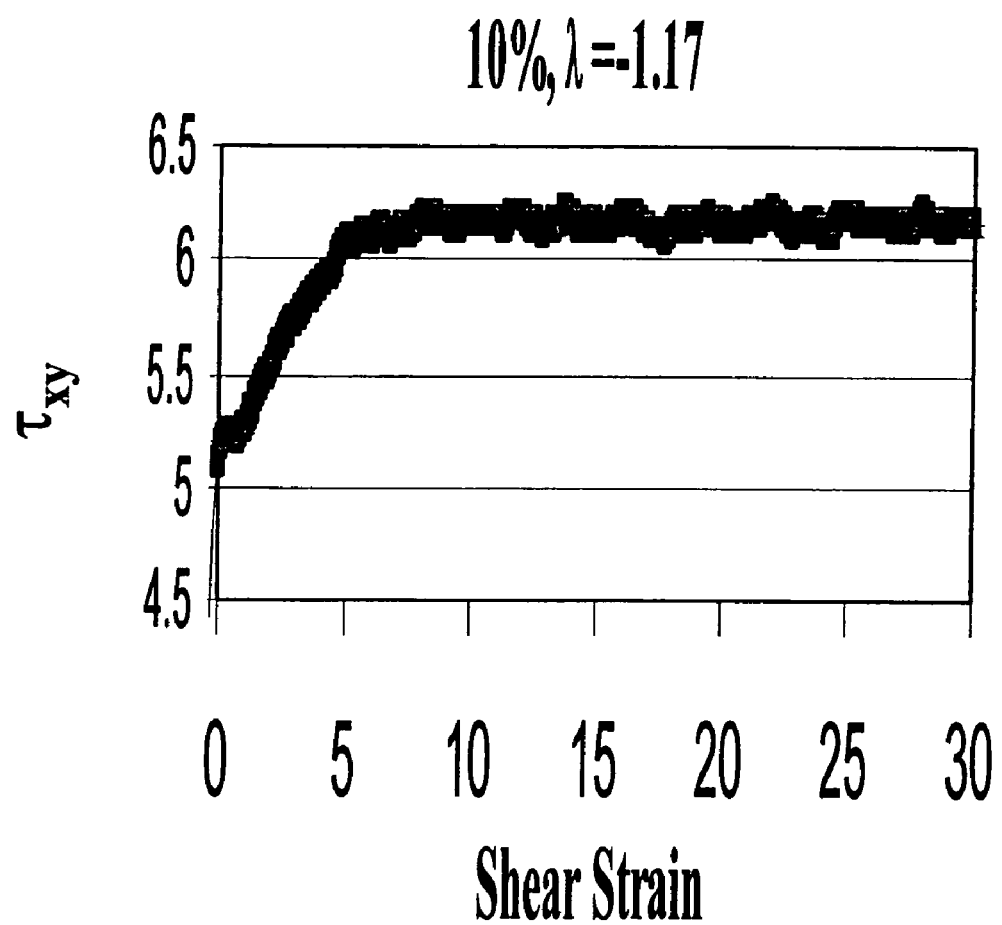
FIG. 6 is a graphical representation of the liquid crystal properties of a liquid crystal system according to the present invention.
Figure 7:
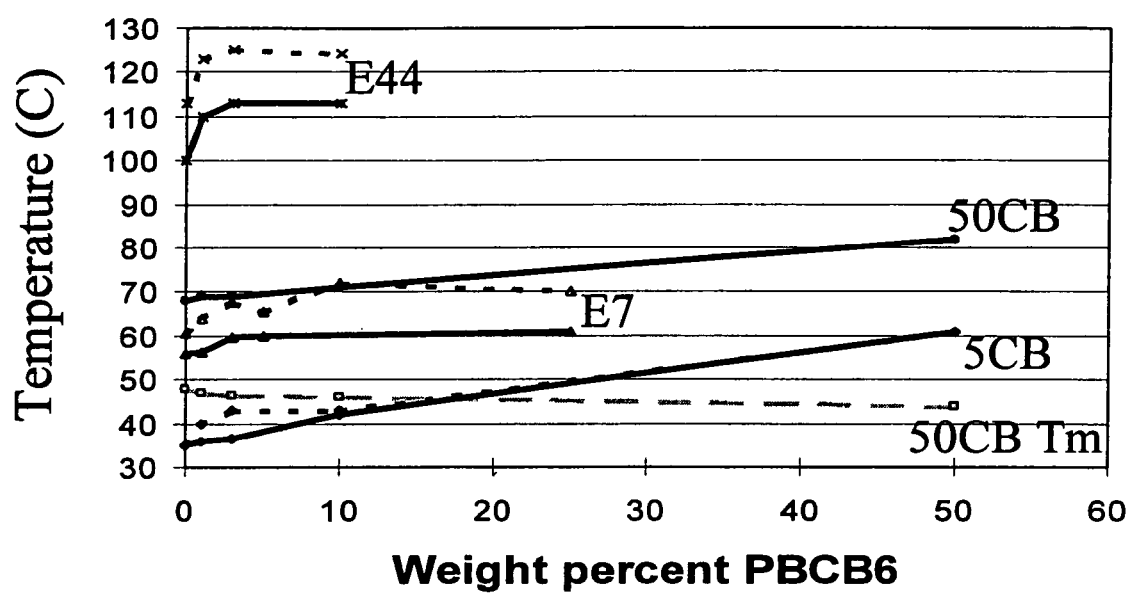
FIG. 7 is a graphical representation of the liquid crystal properties of a liquid crystal system according to the present invention.
Figure 8:
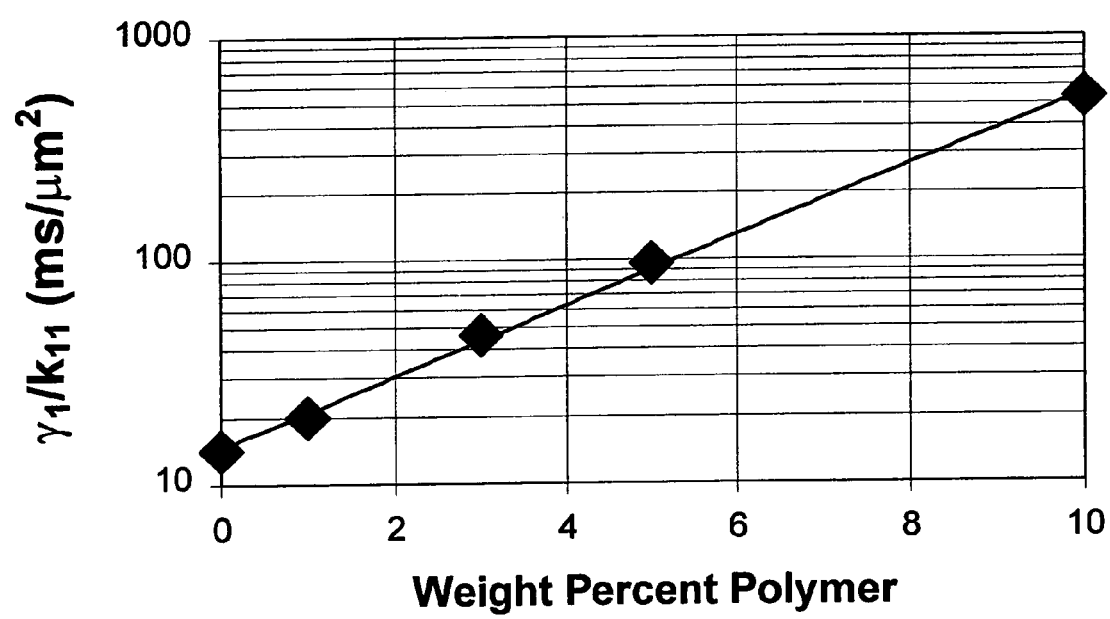
FIG. 8 is a graphical representation of the liquid crystal properties of a liquid crystal system according to the present invention.

Because dilute solutions of high molecular weight polymers have never been used to make electro-optically active materials, FIGS. 6 to 8 show a series of experiments taken using solutions of the high molecular weight polymers according to the invention. FIG. 6 shows that the addition of a low concentration of a high molecular weight polymer according to the present invention can yield high rheological control of liquid crystal alignment. In this case a solution of only 10% polymer having a molecular weight of 800,000 g/mol in a solution of liquid crystal molecules causes the liquid crystal molecules to become flow-aligning not merely parallel to the velocity direction as in solutions containing similar concentrations of small molecular weight polymers, but to become flow-aligning parallel to the velocity gradient direction. Such flow-aligning characteristics indicate that low concentrations of the high molecular weight polymers of the current invention can yield electro-optically active materials having excellent rheological control properties previously only obtainable using high concentrations of low molecular weight polymers.

FIG. 7 shows that the polymer solutions according to the invention can be obtained with a variety of pure liquid crystals and liquid crystal molecules, such as, for example, 50 CB and 5 CB (Merck) as well as in several eutectic mixtures of liquid crystal molecules, such as, for example E7 and E44 (Merck). While these cyanobiphenyl and eutectic mixtures have been utilized in the current embodiments, it should be understood that such optical properties can also be obtained with a variety of other liquid crystal molecules and eutectic mixtures thereof.

The electro-optically active gel material 20 of the current invention is characterized in that the solution of liquid crystal molecules 22 solvent to polymer 24 is a dilute solution such that the switching speed of the electro-optically active material 20 remains fast. FIG. 8 shows a graph of switching time versus the percent polymer 24, as described above having a molecular weight of 800,000 g/mol in the liquid crystal solution. Typical electrooptical devices, such as, for example, liquid crystal display devices have switching times of about 10 ms. Typically, polymer aligning agents are only useful if the switching time of the liquid crystal with the aligning agent is less than double the switching time of the pure liquid crystal material. As shown in FIG. 8, the pure liquid crystal material used in the embodiment shown has a switching time of ~14.6 ms/$\mu$m$^2$ and any increase in the quantity of polymer 24 leads to a substantial increase in the switching time of the device. In the present case the quantity of polymer 24 is preferably held at about 2% or less, as calculated by weight percent of the polymer to solution such that the switching time of the electrooptical device remains less than double the pure liquid crystal switching time. However, this concentration is measured for nematic displays, which are significantly slower than ferroelectric displays. As such, it should be understood that the concentration of polymer in ferroelectric displays could be significantly increased given the inherent switching time of such devices. For example, in the present case, concentrations as high as 6% could be used.

Figure 9:
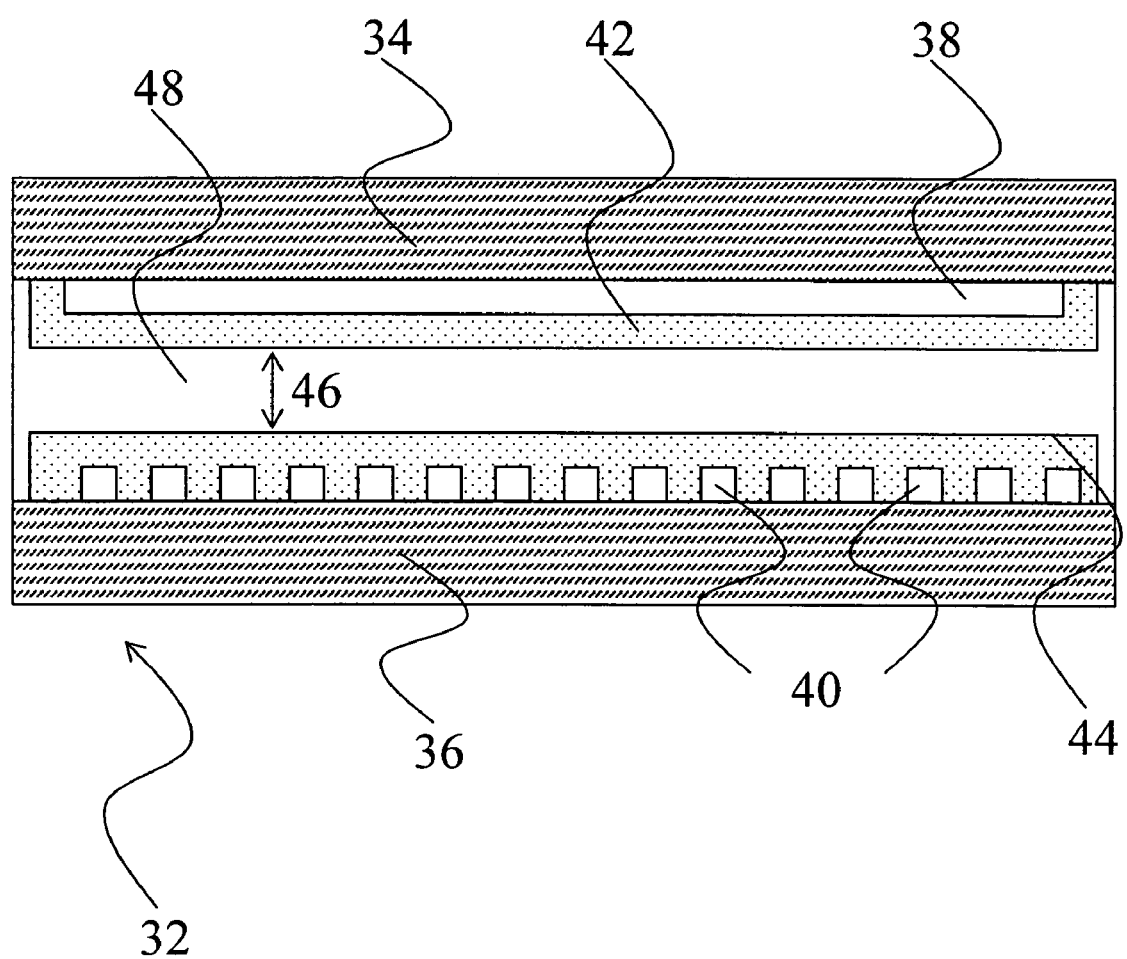
FIG. 9 is a schematic diagram of an electrooptical device incorporating the electro-optically active liquid crystal material of the present invention.

FIG. 9 diagrammatically shows a cross-sectional view of an electrooptic device capable of utilizing the electro-optically active material in accordance with the invention, when configured as a display device 32. The display device 32 comprises two glass substrates 34 and 36 which are provided with a matrix of transparent electrode layers 38 and 40 on the sides facing each other. The electrode layers 38 and 40 can be individually drive via electrically conductive tracks (not shown). On the matrix of the electrode layers 38 and 40 there are provided an orientation layer 42 and 44 of rubbed polyimide. The distance 46 between both orientation layers 42 and 44 forms the thickness of the electro-optically active layer 48 described above. By orienting and then fixing the electro-optically active layer 48 as described above, an oriented electro-optically active layer 48 can be obtained. Although a passive matrix display 32 is described herein, it should be understood that any electrooptic device could be manufactured utilizing the electro-optically active material of the present invention, such as, for example, an active matrix display.

The elements of the apparatus and the general features of the components are shown and described in relatively simplified and generally symbolic manner. Appropriate structural details and parameters for actual operation are available and known to those skilled in the art with respect to the conventional aspects of the process.

Although specific embodiments are disclosed herein, it is expected that persons skilled in the art can and will design alternative electro-optically active materials and electrooptic devices that are within the scope of the following claims either literally or under the Doctrine of Equivalents.

What is claimed is:

1. An electrooptically active gel layer comprising:
   a quantity of liquid crystal molecules; and
   a polymer having at least one middle portion solvated by the liquid crystal molecules, the middle portion being incorporated between at least two end portions, the end portions being physically associated with each other.

2. The gel layer as described in claim 1, wherein the polymer is a block copolymer and the middle portion comprises at least one midblock and the end portions comprise at least two endblocks.

3. The gel layer as described in claim 1, wherein the polymer is telechelic, and wherein the end portions comprise at least two end groups.

4. The gel layer as described in claim 1, wherein the polymer middle portion comprises a mainchain polymer, and wherein a plurality of liquid crystal molecules are incorporated into the mainchain of the polymer.

5. The gel layer as described in claim 1, wherein the polymer middle portion comprises a plurality of sidegroups, and wherein a plurality of liquid crystal molecules are incorporated into the sidegroups of the polymer.

6. The gel layer as described in claim 1, wherein the polymer middle portion comprises a mixed side-chain/mainchain liquid crystal polymer.

7. The gel layer as described in claim 1, wherein the polymer dictates the alignment of the liquid crystal.

8. The gel layer as described in claim 1, wherein the polymer comprises less than 5% of the gel layer by mass.

9. The gel layer as described in claim 1, wherein the polymer comprises equal to or less than 2% of the gel layer by mass.

10. The gel layer as described in claim 1, wherein the polymer has a molecular weight of at least 2 million g/mol.

11. The gel layer as described in claim 1, wherein the polymer has a molecular weight of at least 1 million g/mol.

12. The gel layer as described in claim 1, wherein the polymer has a molecular weight of at least 100,000 g/mol.

13. The gel layer as described in claim 1, wherein the polymer comprises a fluorinated polymer.

14. The gel layer as described in claim 1, wherein the gel layer has a switching time of less than double the switching time of the liquid crystal molecules in the absence of the polymer.

15. The gel layer as described in claim 1, wherein the gel layer has a switching time of less than 10 times the switching time of the liquid crystal molecules in the absence of the polymer.

16. The gel layer as described in claim 1, wherein the end portion further comprises at least one linking portion, wherein the linking portion either physically or chemically cross-links with either the linking portion or end portion of another polymer.

17. The gel layer as described in claim 1, wherein the gel is thermoreversible.

18. The gel layer as described in claim 1, wherein the end portion is made crosslinkable with other end portions by application of either a photo or thermal initiating energy.

19. The gel layer as described in claim 18, wherein the photo initiating energy is selected from the group consisting of: UV-light, X-ray, gamma-ray, and radiation with high-energy electrons or ions.

20. The gel layer as described in claim 1, wherein the liquid crystal molecules are aligned according to a geometry selected from the group consisting of: uniaxial, twisted, supertwisted, tilted, chevron and bookshelf.

21. The gel layer as described in claim 1, wherein the polymer mechanically stabilizes the liquid crystal molecules.

22. The gel layer as described in claim 1, wherein the gel may be reversibly dissolved and gelled.

23. An electrooptic device comprising two substrates, which are provided with at least one electrode, and an electro-optically active gel layer which is located between the two substrates, wherein the electro-optically active gel layer includes a quantity of liquid crystal molecules and a polymer having at least one middle portion solvated by the liquid crystal molecules, the middle portion being incorporated between at least two end portions, the end portions being physically associated with each other.

24. The electrooptic device as described in claim 23, wherein the polymer is a block copolymer and the middle portion comprises at least one midblock and the end portions comprise at least two endblocks.

25. The electrooptic device as described in claim 23, wherein the polymer is telechelic, and wherein the end portions comprise at least two end groups.

26. The electrooptic device as described in claim 23, wherein the polymer middle portion comprises a mainchain polymer and wherein a plurality of liquid crystal molecules are incorporated into the mainchain of the polymer.

27. The electrooptic device as described in claim 23, wherein the polymer middle portion comprises a plurality of sidegroups, and wherein a plurality of liquid crystal molecules are incorporated into the mainchain of the polymer.

28. The electrooptic device as described in claim 23, wherein the polymer middle portion comprises a mixed side-chain/main-chain liquid crystal polymer.

29. The electrooptic device as described in claim 23, wherein the polymer dictates the alignment of the liquid crystal.

30. The electrooptic device as described in claim 23, wherein the polymer comprises less than 5% of the gel layer by mass.

31. The electrooptic device as described in claim 23, wherein the polymer comprises equal to or less than 2% of the gel layer by mass.

32. The electrooptic device as described in claim 23, wherein the polymer has a molecular weight of at least 2 million g/mol.

33. The electrooptic device as described in claim 23, wherein the device is a display device.

34. An electrooptically active gel layer comprising:
   a quantity of liquid crystal molecules; and
   a quantity of polymer molecules, the polymer molecules being homogeneously dispersed within the liquid crystal molecules, the liquid crystal molecules solvating at least a portion of each polymer molecule, each polymer molecule comprising at least one other portion physically associated with a corresponding portion of another polymer molecule.

35. The gel layer as described in claim 34, wherein the physically associated portions of the polymer molecules form crosslinks that produce a polymer network.

36. The gel layer as described in claim 34, wherein the physically associated portions of the polymer are insoluble in the liquid crystal molecules.

37. The gel layer as described in claim 34, wherein the physically associated portions of the polymer comprise covalently cross-linked functional groups.

38. The gel layer as described in claim 34, wherein the physically associated portions of the polymer are covalently cross-linked using photo intiating energy.

39. The gel layer as described in claim 34, wherein the physically associated portions of the polymer are covalently cross-linked using thermal initiating energy.

* * * * *